United States Patent [19]

Schüler et al.

[11] Patent Number: 4,983,261

[45] Date of Patent: Jan. 8, 1991

[54] METHOD OF APPLYING A CATALYST LAYER CONSISTING OF PRECIOUS METALS AND/OR PRECIOUS METAL COMPOUNDS TO A SUBSTRATE OF CERAMIC MATERIAL

[75] Inventors: Claus Schüler, Widen, Switzerland; Gabriele Gerharz, Nagold, Fed. Rep. of Germany

[73] Assignee: Asea Brown Boveri Ltd., Baden, Switzerland

[21] Appl. No.: 455,144

[22] Filed: Dec. 22, 1989

[30] Foreign Application Priority Data

Jan. 11, 1989 [DE] Fed. Rep. of Germany ....... 3900571

[51] Int. Cl.$^5$ .............................................. C25D 5/54
[52] U.S. Cl. ..................................... 204/30; 204/37.1; 204/38.1
[58] Field of Search .................. 204/20, 30, 37.1, 38.4, 204/38.1

[56] References Cited

U.S. PATENT DOCUMENTS

| | | | |
|---|---|---|---|
| 4,543,273 | 9/1985 | Handa et al. | 427/126.3 |
| 4,762,595 | 8/1988 | Postupack et al. | 204/11 |

FOREIGN PATENT DOCUMENTS

| | | |
|---|---|---|
| 0143956 | 6/1985 | European Pat. Off. |
| 1080275 | 4/1960 | Fed. Rep. of Germany |
| 1696125 | 12/1971 | Fed. Rep. of Germany |
| 2132796 | 2/1972 | Fed. Rep. of Germany |
| 2546413 | 4/1976 | Fed. Rep. of Germany |
| 3611273 | 6/1987 | Fed. Rep. of Germany |

OTHER PUBLICATIONS

Sonderdruck aus Chemie in unserer Zeit, Jan. 18, 1984, No. 2, pp. 37–45, E. Koberstein, "Katalysatoren zur Reinigung von Autoabgasen", (Catalytic Converters for Automobile Exhaust Emission Control).

MZT Motortechnische Zeitschrift, 45, (1984), 5, pp. 201–206, P. Oser et al., "Grundlagen zur Abgasreinigung von Ottomotoren Mit der Katalysatortechnik", (Principles of Exhaust Emission Control from Spark-Ignition Engines Using Catalyst Technology).

Material Science and Techology, Sep., 1985, vol. 1, M. G. Nicholas et al., "Ceramic/Metal Joining for Structural Applications", pp. 657–665.

Thin Solid Films, 102, (1983), pp. 1–46, K. L. Chopra et al., "Transparent Conductors—A Status Review".

J. Appl. Phys., 51(12), Dec. 1980, pp. 6243–6251, E. Shanthi et al., "Electrical and Optical Properties of Undoped and Antimony-Doped Tin Oxide Films".

Journal of Materials Science, 21, (1986), pp. 1280–1288, I. S. Mulla et al., "Deposition of Improved Optically Selective Conductive Tin Oxide Films by Spray Pyrolysis".

*Primary Examiner*—John F. Niebling
*Assistant Examiner*—William T. Leader
*Attorney, Agent, or Firm*—Oblon, Spivak, McClelland, Maier & Neustadt

[57] ABSTRACT

Method of applying a catalyst layer consisting of precious metals and/or precious metal compounds to a substrate of ceramic material by an electrically conducting $SnO_2$ intermediate layer, doped with Sb, being pyrolytically applied to the surface of the substrate and subjected to an additional heat treatment for the purpose of consolidation and sintering, whereupon the catalyst layer is applied electrolytically to the intermediate layer.

2 Claims, No Drawings

METHOD OF APPLYING A CATALYST LAYER CONSISTING OF PRECIOUS METALS AND/OR PRECIOUS METAL COMPOUNDS TO A SUBSTRATE OF CERAMIC MATERIAL

BACKGROUND OF THE INVENTION

1. Field of the Invention

Catalyst layers on ceramic substrates for the conversion of exhaust gases from internal-combustion engines.

The invention relates to space-saving means for the afterburning and detoxification of the exhaust gases from road vehicle internal-combustion engines, specifically with regard to the devices for supercharging them.

In particular, it relates to a method of applying a catalyst layer consisting of precious metals and/or precious metal compounds to a substrate of ceramic material.

2. Discussion of Background

Catalytic converters for converting the exhaust gases from internal-combustion engines (spark-ignition and diesel engines) are being used increasingly, in particular in view of environmental pollution, above all for road vehicles. The relevant legal regulations are becoming continually more stringent and it is therefore in the interests of the public at large to utilise all the possibilities of exhaust emission control. The application of electrically conducting tin oxide layers is known from the literature. A common method is spraying with subsequent pyrolysis.

The following publications are cited as prior art:

Edgar Koberstein, Katalysatoren zur Reinigung von Autoabgasen (Catalystic Converters For Automobile Exhaust Emission Control), Chemie in unserer Zeit, 18th year, 1984, No. 2, pages 37–45

Polat Oeser and Walter Brandstetter, Grundlagen zur Abgasreinigung von Ottomotoren mit der Katalysatortechnik, (Principles of Exhaust Emission Control from Spark-Ignition Engines using Catalyst technology), MTZ Motortechnische Zeitschrift 45 (1984) 5, pages 201–206

M. G. Nicholas, D. A. Mortimer, Ceramic/metal joining for structural applications, (1985 The Institute of Metals), Materials Science and Technology, September 1985, Vol. 1, pages 657–665

EP-A-0 143 956

Chopra, K. L., Mayor, S., and Pandya, D. K., Transparent Conductors a Status Review, Thin Solid Films 102 (1983), p.15

E. Shanthi, V. Dutta, A. Banerjee, and K. L. Chopra, Electrical and optical properties of undoped and antimony-doped tin oxide films, J. Appl. Phys. 51(12), December 1980

I. S. Mulla, H. S. Soni, V. J. Rao, A. P. B. Sinha, Deposition of improved optically selective conductive tin oxide films by spray pyrolysis, Journ. of Materials Science 21 (1986), 1280–1288.

In EP-A-0 143 956, a volumetric supercharger (pressure-wave machine) for a road vehicle engine is described, the rotor of which is at the same time designed as a catalyst substrate. This can dispense with the need, at least to some extent, of a separate means of detoxifying the exhaust gases. However, problems arose in the coating of a rotor consisting of a ceramic material, since the rotor, and consequently the catalyst layer, are exposed to very high mechanical and thermal stresses (circumferential forces, temperature changes). The layers must be firmly anchored and must not peel off during operation.

Therefore, there is a great need for further development and perfection of the catalyst coating technique.

SUMMARY OF THE INVENTION

Accordingly, one object of this invention is to provide a novel method of applying a catalyst layer consisting of precious metals and/or precious metal compounds to a substrate of ceramic material which can be used in a simple way even on complicatedly shaped supports and provides firmly adhering surface layers which do not peel off. The results are to be reproducible. The method is also to be capable of being carried out inexpensively. In particular, it is to be capable of being used advantageously on $Si_3N_4$ ceramic.

This object is achieved by the method mentioned at the beginning being used to produce an electrically conducting ceramic intermediate layer by firstly applying pyrolytically a tin oxide layer doped with antimony to the surface of the substrate and it subsequently being subjected to an additional heat treatment at a temperature of 700° C., the antimony thereby being incorporated into the crystal lattice of the tin oxide and the latter being firmly bonded to the substrate by sintering, and by the catalyst layer being applied electrolytically to the ceramic support provided in this way with an electrically conducting intermediate layer.

DESCRIPTION OF THE PREFERRED EMBODIMENTS

The essential idea is to apply to an electrically non-conducting ceramic substrate an electrically conducting ceramic intermediate layer, onto which then in turn a catalytic layer of a precious metal is electrolytically (galvanically) deposited. In the present case, this conducting intermediate layer consists of tin oxide doped with antimony.

The invention is described below with reference to a number of exemplary embodiments:

Exemplary Embodiment

A cylindrical cell wheel of a pressure-wave machine was provided with a catalyst layer of platinum on all sides of the cell walls and on the inner circumference of the radially outer lying surface. For this purpose, an electrically conducting intermediate layer of doped $SnO_2$ was first applied to the said surfaces. The rotor serving as support consisted of $Si_3N_4$ and had an outside diameter of 200 mm and a length of 160 mm. The outer hollow-cylindrical part had a radial wall thickness of 4 mm, the cell walls a thickness of 1.7 mm.

100 g of tin tetrachloride SnCl were dissolved in 1 l of ethyl acetate. To increase the electric conductivity, a further 3.5 mol %—referred to $SnCl_4$—of antimony chloride $SbCl_3$ (practical limits 3 to 4 mol %) were added to this solution. The cell wheel was heated to 500° C. (practical temperature interval 400° to 600° C.) in an electrically heated muffle furnace and, after opening the furnace doors, sprayed with the $SnCl_4$ solution for a few seconds and kept further at the temperature by subsequent closing of the doors. A commercially available aerosol sprayer of glass was used for the spraying. The spraying operation was repeated after a little time and this cycle continued until an $SnO_2$ layer of 5 μm thickness on average was produced (practical limits of the layer thickness 1 to 10 μm).

The reactions occurring in the presence of steam are a combined pyrolysis/hydrolysis, approximately in accordance with the following scheme:

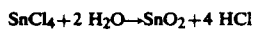

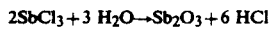

The cell wheel was subsequently heat-treated for an hour at a temperature of 700° C., the intermediate layer thereby assuming its final constitution.

After cooling, the inner surface of the cell wheel was coated with a firmly-adhering, sintered-on layer of $SnO_2$ doped with Sb having an average electric conductivity of $5 \cdot 10^3$ $(\Omega cm)^{-1}$ (practical values between $10^3$ and $10^4$ $(\Omega cm)^{-1}$).

Then a catalyst layer of 0.16 mg/m² of platinum content was deposited by the electrolytic method of the Johnson Matthew Company, GB (JMC) on the intermediate layer of $SnO_2$ produced in this way.

The invention is not restricted to the exemplary embodiment.

In general, the method of applying a catalyst layer consisting of precious metals and/or precious metal compounds to a substrate of ceramic material can be carried out by producing an electrically conducting ceramic intermediate layer, firstly applying pyrolytically a tin oxide layer doped with antimony to the surface of the substrate and subsequently subjecting it to an additional heat treatment at a temperature of 700° C., the antimony thereby being incorporated into the crystal lattice of the tin oxide and the latter being firmly bonded to the substrate by sintering, whereupon the catalyst layer is applied electrolytically to the ceramic support provided in this way with an electrically conducting intermediate layer.

The substrate preferably consists of silicon nitride and the intermediate layer of tin oxide, doped with antimony, of 0.5–10 μm thickness having a conductivity of $10^3$–$10^4$ $(\Omega cm)^{-1}$.

Obviously, numerous modifications and variations of the present invention are possible in the light of the above teachings. It is therefore to be understood that, within the scope of the appended claims, the invention may be practiced otherwise than as specifically described herein.

What is claimed as new and desired to be secured by Letters Patent of the United States is:

1. A method of applying a catalyst layer consisting of precious metals and/or precious metal compounds to a substrate of ceramic material, wherein an electrically conducting ceramic intermediate layer is produced by firstly applying pyrolytically a tin oxide layer doped with antimony to the surface of the substrate and it subsequently being subjected to an additional heat treatment at a temperature of 700° C., the antimony thereby being incorporated into the crystal lattice of the tin oxide and the latter being firmly bonded to the substrate by sintering, and wherein the catalyst layer is applied electrolytically to the ceramic support provided in this way with an electrically conducting intermediate layer.

2. A method as claimed in claim 1, wherein the substrate consists of silicon nitride and wherein an intermediate layer of tin oxide, doped with antimony, of 0.5–10 μm thickness having a conductivity of $10^3$–$10^4$ $(\Omega cm)^{-1}$ is produced.

* * * * *